United States Patent Office 3,555,108
Patented Jan. 12, 1971

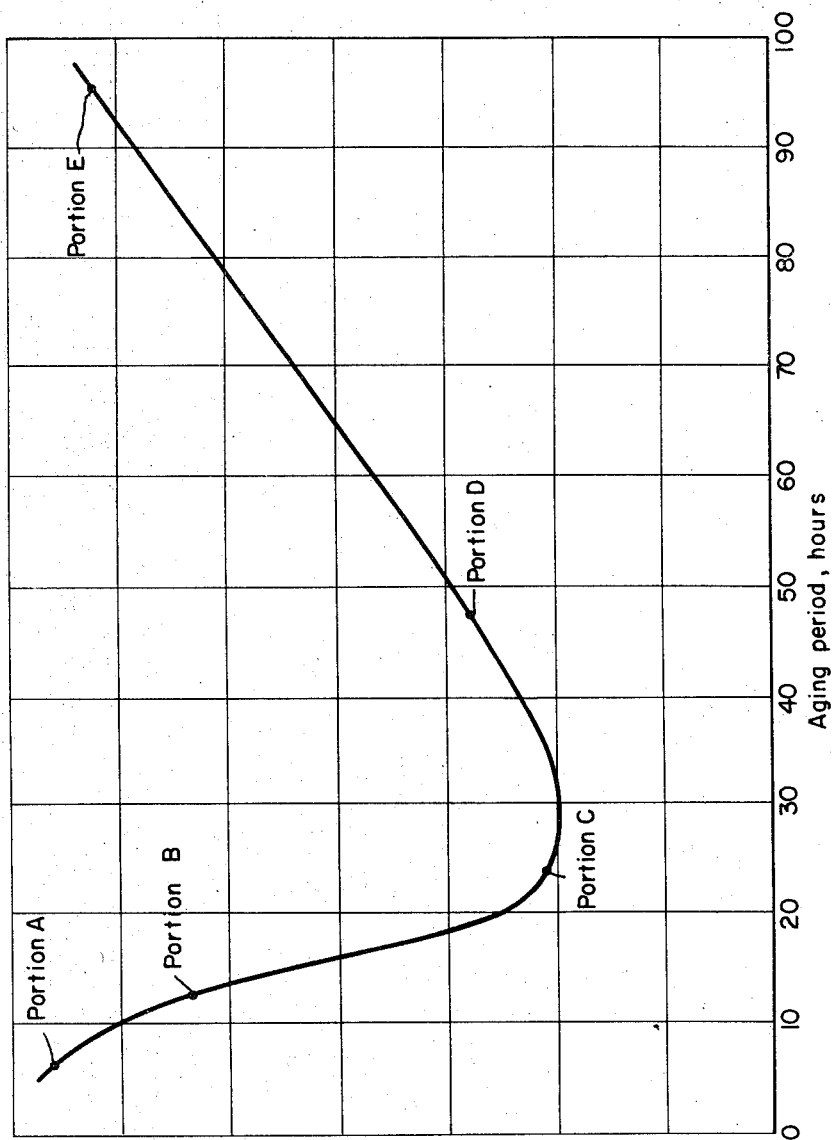

3,555,108
METHOD OF PROVIDING USEFUL HEAT-SETTING AROMATIC POLYMER RESINOUS COMPOSITIONS AND PRODUCTS
Norman Bilow, Los Angeles, and Leroy J. Miller, Canoga Park, Calif., assignors to Hughes Aircraft Company, Culver City, Calif., a corporation of Delaware
Continuation-in-part of application Ser. No. 349,770, Mar. 5, 1964. This application Sept. 5, 1967, Ser. No. 665,578
Int. Cl. C08d *13/00*
U.S. Cl. 260—823                                                             10 Claims

ABSTRACT OF THE DISCLOSURE

The combination of an aromatic polyphenylene, polyphenylene oxide, polyphenylene sulfide, polybenzimidazole, with aromatic polymethylol and acid catalyst material forming a resin in partially reacted state in solution and a soluble and fusible plastic product, composition thereof curable to a useful infusible state, with or without the addition of other material.

---

The invention herein described was made in the course of or under a contract with the Air Force.

This application is a continuation-in-part of our application Ser. No. 349,770, filed Mar. 5, 1964 (abandoned), and relates to the herewith filed applications, "Improvement In The Method of Preparing Polyphenylene Polymers And Product Thereof," Ser. No. 665,262, and "Method of Preparing Aromatic Resins and Products Thereof," Ser. No. 665,261, of Norman Bilow, all assigned to the present assignee, Hughes Aircraft Company, and included herein by reference thereto.

This invention relates to a method of producing commercially useable new curable aromatic polymer resin compositions and provides the art with new aromatic lacquer and plastic forming material, consisting of a fusible and tractable aromatic resinous material prepared from aromatic derivatives of benzene as polyphenyl and polybenzyl compounds selected from the group consisting of branched polyphenylene, polyphenylene oxide material, polyphenylene sulfide material, and polybenzimidazoles, and mixtures of same, and a method of curing the same with a combination consisting of a non-phenolic polymethylol aromatic compound and an acid, and the products thereof. More particularly, the improvement concerns the provision of new resinous compositions of the preferred fusible and tractable polyphenylene polymers in combination with a mutually soluble, polymer forming curing system of the character of an aromatic polymethylol material as a $\alpha\alpha'$-dihydroxy aromatic compound or derivative thereof, in combination with an acid catalyst therefor, and preferably in admixture therewith a strong acid catalyst for the cure thereof in solution or moldable plastic form.

As described in our above-mentioned application Ser. No. 349,770 and continuation-in-part thereof, filed herewith, entitled "Method of Manufacture of Polyphenylenes and Products Thereof," the disclosure therein relates to fusible and tractable polymeric materials produced from biphenyl, terphenyls and quaterphenyls, including the isomers and mixtures thereof, and particularly from ortho-terphenyl, meta-terphenyl, 1,3,5-triphenylbenzene, isomers and mixtures thereof and mixtures of these compounds with other phenylene oligomers or polyphenyls with less than five aromatic rings, and to the method of production thereof. Herein, the disclosure is concerned essentially with the preparation of fusible and soluble partial polymers of polyphenylene and polybenzimidazoles with a curing agent forming a resin system and particularly for the curing of such polyphenylene resins, and the products obtained therewith.

The preferred polyphenylene resins utilized in this disclosure in combination with the curing agent therefor owe their fusibility and tractability to the presence of aromatic branches, primarily phenyl or biphenyl branches, on the main polyphenylene chains.

Such branched polyphenylenes are thus preferably utilized herein to provide fusible and tractable compositions, in heat curable lacquer and plastic forms. Such polyphenylenes also have carbon:hydrogen ratios of over 1.3, of and about 1.5 up to 1.7, herein designated about 1.5.

For many applications in the art of molding and fabricating laminated structures of high thermal stability, it is essential to use a high temperature stable polymer having a high molecular weight. At the same time, it is essential that the polymer be fusible and preferable, in the copolymerizable stages, that it be soluble in selected organic solvents. The exceptional characteristics of the combination of branched phenylene polymers with a curing agent therefor, as described herein, is the possession of the following properties simultaneously:

(1) They have excellent thermal stability, upon curing, exhibiting negligible weight loss between 400–500° C. in inert atmospheres;

(2) The polyphenylenes utilized in the combination have mean molecular weights ranging between 1,000±500 and 5,000, and preferably on the order of 700 to 2000 and cure to high temperature stable polymers having a high molecular weight;

(3) The polyphenylenes, in their semicured state, are sufficiently soluble in suitable organic solvents, especially when hot, to permit their use in paint compositions, lacquers, enamels, and varnishes;

(4) They are fusible and flow sufficiently at temperatures between 100° C. and 400° C. to permit them to be molded under heat and pressure, and (5) They cure to hard, high temperature resistant coatings, laminated and molded compositions.

It is this combination of properties, which makes the curable polyphenylene polymers unique and in the curable or cured state constitutes a significant advancement over the prior art. A method for utilizing these branched phenylene polymers to fabricate paints, varnish and lacquer, including laminated objects and molded products, by adding a curing agent and subsequently curing the polymers is provided. Useful objects produced in this manner include heat curable paint, varnish, enamel, and lacquer coating vehicles and laminated and molded electrical insulators, rocket nozzles, and structural materials which are required to withstand ablative conditions and high temperatures.

Accordingly, it is an important object of this invention to provide a method for producing compositions of curable phenylene polymers which, in the cured state, are resistant to high temperatures, or otherwise are soluble in certain solvents and in combination with the curing agent therefor are fusible and useful in molding and laminating compounds.

It is another object of this invention to provide fusible, soluble and high temperature stable branched phenylene polymers in combination with a curing agent having utility for various purposes such as in preparation of lacquer, enamel, varnish and paint compositions, and molding or laminating compounds.

A further object of this invention is to provide a feasible method for obtaining economically useful curable aromatic compositions and particularly branched phenylene polymers in heat curable form and to be able to produce therefrom infusible useful polymers of high temperature stability in the form of coatings, molded or laminated structures.

More particularly, the chief object of this invention or improvement may generally be expressed as providing a new disclosure of curable composite resins comprising a partially reacted copolymer of a polymethylol aromatic polymer or telomer and a normally noncurable aromatic polymer in a combined state, to produce aromatic resinous compositions that may be cured by the application of heat or heat and pressure, or compositions which comprise a normally non-curable aromatic polymer and a polymer or telomer derived from the self-condensation of a nonphenolic polymethylol aromatic compound with a strong acid catalyst; or to provide partial reaction products of an aromatic polyphenylene polymer and a polymer or telomer derived from the self-condensation of a nonphenolic polymethylol aromatic compound preferably in combination with a strong organic-substituted mineral acid catalyst therefor, said partial reaction products being soluble in solvents, but being capable of being cured to commercially useful insoluble and infusible coating, aminated, or moded forms upon the application of heat, or heat and pressure, and to make available curable composite resins derived from normally non-curable aromatic polymers.

Essentially, the condensable aromatic, as indicated, is a polymethylolaromatic compound of the character of polyoxyxylene and derivatives having the structural formula

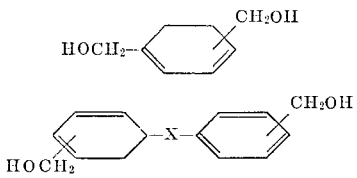

and mixtures of the same, and X is selected from the group consisting of oxygen, sulfur

and the like as disclosed in the copending application for "Self Curing Resinous Catalyst System And Method," Ser. No. 665,303, of Leroy J. Miller, and in which I am coinventor. The additional ring substituents may be noninterfering hydrogen, alkyl, aryl, alkaryl, arylalk, alkoxy, aryloxy, and partially halogenated derivatives thereof. The exampes are illustrative of a preferred method of application of the above utilizing a typical and preferred prepolymer solution thereof prepared, by substitution of such monomers and polymers, and mixture of the same, in the manner as illustrated and embodied herein.

Stated in more particular terms, the essential objects of this invention are illustrated and attained by combining the preferred combination of fusible and tractable polyphenylene material, with polymerizable nonphenolic polymethylol aromatic compounds, either preferably prepared as prepolymers or as polymeric curing agents formed in situ, and in either case, reacted with the said polyphenylene and the like materials, including mixtures therewith, cured in the presence of an acid catalyst.

As the acid catalysts portion of the curing agent, we preferably employ aromatic sulfonic acids such as p-toluenesulfonic acid, benzene sulfonic acid, acetamidobenzenesulfonic acid, hexanesulfonic acid, cyclohexane sulfonic acid, and mixtures thereof, including mixtures with less preferably acids.

Less preferably, we may otherwise employ phosphoric acids, alkylphosphonic acids, arylphosphonic acids, alkylphosphonous acids, arylphosphonous acids, sulfuric acid, sulfurous acid, alkyl- and arylcarboxylic acids, partially halogenated derivatives of these proper acids, and mixtures of such acids. In respect to the curing agent addition, we may utilize an excess effecting an initial reaction with retention of a portion of the catalyst to effect subsequent cure. Otherwise, the acid addition may be in proportion to effect initial reaction, or partial reaction and subsequently add additional catalyst to effect curing of the mixture. Thus, a weak acid may be used initially to effect partial cure and a stronger acid subsequently added in preparation for final cure.

In conjunction with the accompanying drawing illustrating the molding characteristics of the composite herein described, the following are nonlimiting examples illustrating compositions and products and their method of preparation, particularly affording fusible and soluble (tractable) aromatic resinous compositions and particularly with the preferred polyphenylene polymers useful in the arts for preparing paints, varnish, lacquers, adhesives, molding and fabricating compositions not heretofore known to be available for such applications.

EXAMPLE I

A mixture of 46 grams, 0.2 mole ortho-terphenyl and 30.8 grams, 0.2 mole biphenyl and 108 grams, 0.8 mole anhydrous cupric chloride was heated to 135° C. While stirring continuously, 145 grams, 1.1 mole anhydrous aluminum chloride was added in small portions over a one-hour period. Heating then was continued for 3¼ hours at temperatures varying between 158–180° C. The inorganic salts were removed by several washings with 6 N hydrochloric acid, followed by several water washes. After extracting the product continuously in a Soxhlet extractor with a boiling mixture of benzene (15–20%) in cyclohexane for two days, the product was then extracted continuously with boiling chlorobenzene for one day. The chlorobenzene solution was concentrated to a small volume and the polymer was precipitated with cyclohexane. This polymer fraction melted at 180–220° C. A preferred method of heating is now discovered to be on the order of 100–170° C. and the several washings with 12 N hydrochloric acid.

A mixture of 75 milliliters of chloroform, 7.5 grams α,α'-dihydroxy-p-xylene, and 2.25 grams p-toluenesulfonic acid monohydrate is refluxed for 40 hours. Water is removed continuously from the reaction mixture by trapping condensate in an azeotropic trap. Traces of undissolved solids were removed from the prepolymer solution by filtration, and this solution was combined with a solution of 15.0 grams of a phenylene polymer in tetrachloroethane (for example, the polyphenylene polymer prepared above). The lacquer was concentrated by boiling off excess solvent until it contained between 6 and 7% solids by weight. This lacquer was used to coat a glass fabric, which, after evaporation of the solvent, was used to prepare a laminate. Curing was accomplished by placing several saturated layers of the fabric in a mold and heating at 260° C. for a period of about 2 hours, under a pressure of 10,000 pounds per square inch. The molded specimen is preferably post cured as hereinafter described.

EXAMPLE II

Branched, fully aromatic polyphenylene resins were prepared from m-terphenyl and biphenyl mixtures using ferric chloride and/or aluminum chloride catalyst and cupric chloride oxidant as catalyst-oxidant combinations, made according to the above process and as disclosed herein and in application Ser. No. 349,770. The polymers obtained are characterized in that they have a mean molecular weight in the range of 1,000–1,500 are insoluble in boiling solvent consisting of 20% benzene and 80% cyclohexane, soluble in hot bromobenzene, and melting in a range of 190–220° C.

Sixty-four grams of the above described branched, fully aromatic polyphenylene resin were dissolved in 300 ml. of trichloroethylene by heating under reflux for several hours.

A solution of telomer of 1,4-dimethylolbenzene and p-toluenesulfonic acid was prepared according to the above process by mixing 35 grams of 1,4-dimethylolbenzene and 10.5 grams of p-toluenesulfonic acid monohydrate with 350 ml. of chloroform and refluxing for 40 hours until evolution of water practically ceased.

The latter solution was mixed with the solution of branched fully aromatic polyphenylene resin in trichloroethylene as described above, while hot, and refluxing of the mixed solutions was continued. From time to time, a portion of the solution was removed for evaluation. Portion A was removed after 6 hours and 10 minutes of refluxing; Portion B after 13 hours and 20 minutes; Portion C after 24 hours and 20 minutes; Portion D after 48 hours; and Portion E after 96 hours. Composite, partially reacted resins were formed in all cases, with those which were heated the longest having been reacted to a greater degree.

In order to ascertain the molding characteristics of these composite, partially reacted resins, the solvent solution of each portion was used to impregnate a silica fiber cloth known to the trade as Refrasil C–100–48, so that the impregnated assembly when free of solvent contained a sufficient amount of the composite, partially reacted resin, and so that, after cure and postcure, the reinforced laminate contained 41% resin and 59% of the silica fiber cloth. The impregnated cloth was formed into cured laminates by heating in a press between platens at 400° F. while pressing at a pressure of 3000 p.s.i. for two hours. After cure, the specimens were postcured 18 hours at 275° F., then programmed from 275–550° F. over 108 hours, and then kept at 550° F. for six hours. The postcured laminate specimens were then cut and machined to proper dimensions and placed in a plasma arc device having a plasma composition of 20% oxygen and 80% nitrogen with a heat flux of 550 B.t.u. per square foot per second. The erosion depth for each specimen was measured after one minute of exposure. In this manner, the effect of the degree of reaction of the composite, partially reacted resin on the ultimate hyperthermal characteristics of a laminate could be ascertained. FIG. 1 gives a graph of the results of these determinations. It can readily be seen that in Portion A, as well as in Portion B, too little reaction had occurred. However, Portions C and D had been reacted to an optimum degree for this combination of materials and reacting conditions, whereas Portion E had been reacted too much and its hyperthermal properties had been deleteriously affected thereby.

EXAMPLE III

A branched, fully aromatic polyphenylene resin was prepared according to the above process from 1.5 moles of meta-terphenyl and 1.5 moles of biphenyl using 2.3 moles of aluminum chloride as catalyst and 6 moles of cupric chloride as oxidant. The resin was characterized by being insoluble in boiling 20% benzene–80% hexane solvent, soluble in boiling bromobenzene and having a melting range of 188–208° C.

A telomer of 1,4-dimethylolbenzene and p-toluenesulfonic acid was prepared according to the above process by refluxing a mixture of 35 grams 1,4-dimethylolbenzene, 10.5 grams p-toluenesulfonic acid monohydrate and 350 ml. of chloroform for 40 hours until water evolution had ceased.

34.7 grams of the branched, fully aromatic polyphenylene resin as described above were dissolved in 150 ml. of trichloroethylene by refluxing for 65 hours. While still hot, 104 grams of the telomer solution described above were added, and heating and refluxing were continued. 50 ml. of additional chloroform were added, and refluxing at about 72° C. was carried out for 24 hours. The solution at room temperature was clear, of moderate viscosity, stable, and contained a very small amount of sediment. On evaporating off the solvent, a hard, grindable composite resin was secured which was fusible and soluble, but which could be cured to an infusible material upon the application of heat.

EXAMPLE IV

A branched, fully aromatic polyphenylene resin was prepared according to the above process from 7 moles of meta-terphenyl and 6 moles of biphenyl using aluminum chloride as catalyst and cupric chloride as oxidant. The resin was characterized by being insoluble in boiling 20% benzene—80% hexane solvent, soluble in boiling chlorobenzene and having a melting range of 180–210° C.

A telomer of 1,4-dimethylolbenzene and p-toluenesulfonic acid was prepared according to the above process by refluxing a mixture of 45 grams 1,4-dimethylolbenzene and 13.5 grams of p-toluenesulfonic acid monohydrate in 464 ml. of chloroform for 40 hours until the evolution of water had ceased.

146 grams of the branched, fully aromatic polyphenylene resin as described above were dissolved in tetrachloroethane at the boiling point, and the telomer solution as described above was added while hot, along with 750 ml. of chloroform. The solution was refluxed for 22 hours, and 200 ml. of chloroform and 200 ml. of trichloroethylene were added. The final lacquer contained 6% of solids. On evaporating off the mixed solvent, a hard, homogenous composite resin was secured which could be easily ground to a fine powder and which was fusible and soluble, but which could be cured to an infusible material upon the application of heat.

EXAMPLE V

A branched, fully aromatic polyphenylene resin was prepared according to the above process from 1.5 moles of meta-terphenyl and 1.5 moles of biphenyl using 2.3 moles of aluminum chloride as catalyst and 6 moles of cupric chloride as oxidant. The resin was characterized by being insoluble in boiling 20% benzene—80% hexane solvent, soluble in boiling bromobenzene and having a melting range of 188–208° C.

A telomer of 1,4 - dimethylolbenzene and p-toluenesulfonic acid was prepared according to the above process by refluxing a mixture of 35 grams of 1,4-dimethylolbenzene, 10.3 grams of p-toluenesulfonic acid monohydrate and 350 ml. of chloroform for 40 hours until the evolution of water had ceased.

3.1 grams of the branched, fully aromatic polyphenylene resin as described above were swollen in 50 ml. of tetrachloroethane and 450 ml. of chloroform were added. While hot, 13.9 ml. of the telomer solution as described above were added and refluxing of the resulting solution was carried out for about 24 hours. At room temperature, the resulting solution of reaction product had a moderate viscosity and was stable. On evaporating off the solvent a hard, dark-colored, homogeneous resin was secured which could be ground to a fine powder. The resin was fusible and soluble, and could be cured to an infusible and insoluble material upon the application of heat.

EXAMPLE VI

A branched, fully aromatic polyphenylene resin was prepared according to the above process and described in Example V.

A telomer of 1,4-dimethylolbenzene and p-toluenesulfonic acid was prepared according to the above process by refluxing a mixture of 3 grams of 1,4-dimethylolbenzene with 1 gram of p-toluenesulfonic acid monohydrate in 50 ml. of tetrachloroethane and 100 ml. of chloroform for 40 hours, until the evolution of water had ceased.

3.0 grams of the branched, fully aromatic polyphenylene resin as described above were dissolved in 60 ml. of tetrachloroethane, and 78 grams of the solution of telomer described above were added while hot. Refluxing was carried on for 24 hours. Upon evaporation of the solvent from the resulting solution, a hard, homogenous dark resin was obtained which could be ground to a fine powder. The resin was fusible and soluble, and could be cured to an insoluble and infusible material upon the application of heat.

EXAMPLE VII

A branched, fully aromatic polyphenylene resin was prepared according to the above process from 1.5 moles of meta-terphenyl and 3 moles of biphenyl using 2.25 moles of aluminum chloride as catalyst and 4.5 moles of cupric chloride as an oxidant. The resin was characterized by being insoluble in boiling 20% benzene—80% hexane solvent, soluble in boiling chlorobenzene and having a melting range of 180–210° C.

A telomer of 1,4-dimethylolbenzene and p-toluenesulfonic acid was prepared according to the above process by refluxing a mixture of 35 grams of 1,4-dimethylolbenzene and 10.5 grams of p-toluenesulfonic acid monohydrate in 350 ml. of chloroform for 24 hours.

100 grams of the branched, fully aromatic polyphenylene resin as described above were dissolved in 100 ml. of tetrachloroethane and 100 ml. of trichloroethylene, then 200 ml. of chloroform were added. While boiling, the solution of the telomer described above was added, and the resulting solution was heated under reflux for 24 hours. A homogeneous, somewhat viscous solution was obtained. On evaporating off the solvent, a hard homogeneous composite resin was secured which was readily grindable to a fine powder. It could be cured, as herein described, to an insoluble and infusible material on the application of heat. Otherwise, before curing, the composite resin was resoluble in a suitable solvent and utilized as impregnating, coating and laminating material.

EXAMPLE VIII

A branched, fully aromatic polyphenylene resin was prepared according to the above process from 2 moles of meta-terphenyl and 2 moles of biphenyl using 3 moles of aluminum chloride as catalyst and 8 moles of cupric chloride as oxidant. The resin was characterized by being insoluble in boiling 20% benzene-80% hexane solvent, soluble in boiling chlorobenzene and having a melting range of 188–210° C.

A telomer of 1,4-dimethylolbenzene and p-toluenesulfonic acid was prepared according to the above process by refluxing a mixture of 30 grams of 1,4-dimethylolbenzene, 8.4 grams of p-toluenesulfonic acid monohydrate and 400 ml. of chloroform for 28 hours. The final solution was diluted to a total volume of 500 ml. with additional chloroform.

86 grams of the branched, fully aromatic polyphenylene resin described above were slurried at room temperature with 90 ml. of s-tetrachloroethane. The slurry was heated to form a solution, and 90 ml. of trichloroethylene were added. When a homogeneous solution was secured, 180 ml. of chloroform were added along with the 500 ml. of telomer solution described above. The resulting solution was heated under reflux for 24 hours to yield a homogeneous solution of moderate viscosity. On evaporating off the solvent, a homogeneous, hard resin was obtained which could be ground to a fine powder. The resin could be cured to an infusible and insoluble material by heating to 160° C. or higher.

EXAMPLE IX

A branched, fully aromatic polyphenylene resin was prepared according to the above process from 2 moles of meta-terphenyl and 2 moles of biphenyl using 3 moles of aluminum chloride as catalyst and 8 moles of cupric chloride as oxidant. The resin was characterized by being insoluble in boiling 20% benzene-80% hexane, soluble in boiling chlorobenzene and having a melting range of 180–210° C.

A telomer of 1,4-dimethylolbenzene and p-toluenesulfonic acid was prepared according to the above process by refluxing a mixture of 75 grams of 1,4-dimethylolbenzene and 22.5 grams of p-toluenesulfonic acid monohydrate in 1300 ml. of chloroform for 30 hours to remove evolved water.

203 grams of the branched, fully aromatic polyphenylene resin described above were slurried with 200 ml. of s-tetrachloroethane at room temperature, then heated to boiling, and 200 ml. of trichloroethylene were added. The solution was boiled under reflux until entirely homogeneous, and 400 ml. of chloroform were added, followed by the telomer solution described above. The resulting solution was refluxed for 24 hours to yield a homogeneous, stable solution. Upon evaporating off the solvent, a hard, homogeneous resin was secured which could be ground to a fine powder. The resin could be cured to an insoluble and infusible material upon heating to a temperature in excess of 150° C.

EXAMPLE X

A branched, fully aromatic polyphenylene resin was prepared according to the above process from 5 moles of meta-terphenyl and 5 moles of biphenyl using 10 moles of aluminum chloride as catalyst and 20 moles of cupric chloride as oxidant. The resin was characterized by being insoluble in boiling 20% benzene-80% hexane solvent, soluble in boiling chlorobenzene and having a melting range of 185–220° C.

A telomer of 1,4-dimethylolbenzene and p-toluenesulfonic acid was prepared according to the above process by refluxing 48 grams of recrystallized 1,4-dimethylolbenzene, 14.4 grams of p-toluenesulfonic acid monohydrate and 500 ml. of chloroform for 24 hours.

145 grams of the branched, fully aromatic polyphenylene resin described above were slurried in 150 ml. of s-tetrachloroethane at room temperature and the slurry was then heated to boiling, and 150 ml. of trichloroethylene were added. When the boiling solution appeared to be homogeneous, 150 ml. of chloroform were added followed by the telomer solution described above. Heating under reflux was continued for 24 hours. Upon removal of the solvent by evaporation, there was obtained a hard, homogeneous resin capable of being ground to a fine powder. The resin could be easily cured to an insoluble, infusible material by heating it almost to its fusion point.

EXAMPLE XI

A branched, fully aromatic polyphenylene resin was prepared as described in Example X. A telomer of 1,4-dimethylolbenzene and p-toluenesulfonic acid was prepared according to the above process by refluxing a mixture of 19.2 grams of 1,4-dimethylolbenzene and 5.77 grams of p-toluenesulfonic acid monohydrate in 300 ml. of chloroform for 26 hours.

38.5 grams of the branched, fully aromatic polyphenylene resin described above were slurried in 72 ml. of s-tetrachloroethane, and after the slurry was heated to boiling, 72 ml. of trichloroethylene were added. After securing a homogeneous solution, 150 ml. of chloroform were added followed by the telomer solution described above. Heating at reflux was continued for 24 hours to secure a solution which when cooled to room temperature was homogeneous and stable. Upon removal of the solvent by evaporation, a hard, homogeneous resin was obtained which could be easily ground to a fine powder. The resin could be cured to an insoluble and infusible material by heating at an elevated temperature, and under pressure if desired.

EXAMPLE XII

A branched, fully aromatic polyphenylene resin was prepared as described in Example X. A telomer of 1,4-dimethylolbenzene and p-toluenesulfonic acid was prepared according to the above process by refluxing 33.4 grams of recrystallized 1,4-dimethylolbenzene and 10.5 grams of p-toluenesulfonic acid monohydrate in 350 ml. of chloroform for 20 hours.

134 grams of the branched, fully aromatic polyphenylene resin described above were mixed with 200 ml. of s-tetrachloroethane at room temperature. The mixture was heated to boiling, and 400 ml. of trichloroethylene were added with continued heating for 45 minutes. While boiling, the telomer solution described above was added, and refluxing was continued for 6½ hours to yield a homogeneous solution. Upon removal of the solvent by evaporation, there was obtained a hard, homogeneous resin which could be ground to a fine powder. The resin was curable to an insoluble and infusible material upon heating to an elevated temperature.

Additional usage of the polyphenylene resin material is illustrated by the following.

EXAMPLE XIII

A solution of polyphenylenes having a mean molecularular weight of about 1000±500 is reacted with a curing agent derived from the reaction of 1,4-benzenedimethanol and p-toluenesulfonic acid in chloroform. The reaction product is a thermosetting polyphenylene lacquer or varnish. The superiority of the 1000±500 mean molecular weight polyphenylenes to the higher polymer, is attributed to the superior solubility characteristics of the lower polymers fraction; thus, because these lower polymers are more soluble in solvents such as trichloroethylene and chloroform, they react in a more homogeneous manner with the curing agents, thus producing more homogeneous thermosetting prepolymer lacquers. These prepolymers mold at lower temperatures ($\simeq 400°$ F.), and pressures (500–3000 p.s.i.) and produce highly superior composite structures such as laminates. These superior molding parameters also make the materials easier to handle. Not only do the composite structures appear better, and have greater strength, but also, they exhibit superior hyperthermal properties.

For further illustration of the compositions herein described and their application for use as ablative materials or ablative components of rockets, such as rocket nozzles, electrical insulators, and structural materials which must be resistant to high temperatures, the following is provided:

EXAMPLE XIV 1,4-benzenedimethanol (0.9 g.) and p-toluenesulfonic acid monohydrate (0.6 g.) are mixed and heated to obtain a clear melt. The melt is heated with thorough stirring until polymerization, which is accompanied by an increase in viscosity, has proceeded to the desired extent, as determined by the removal of water with retention of solubility. The product is then dissolved in boiling chloroform (20 ml.). If the polymerization has not proceeded far enough, an insoluble oil is obtained at this point. If the polymerization has been carried too far, the product is largely an insoluble white solid. If the polymerization is permitted to continue still further, an insoluble black solid is obtained. The solution may be filtered and used if only small amounts of insoluble solids are present. This solution is mixed with a chloroform solution of an appropriate polyphenylene, and the solvent is boiled off while the solution is stirred vigorously. The residue is then placed in the desired mold, compressed, and cured by heating at approximately 400° F. for 3 hours under pressures of 300–700 p.s.i. The object is cooled under pressure, removed from the mold, and postcured in an oven in which the temperature is slowly raised to 400° F.

Objects prepared in this manner may be used as ablative material or ablative components of rockets, such as rocket nozzles, electrical insulators, and the like; other structural materials which are resistant to high temperatures and require retention of structural strength under condition of abuse may be prefabricated. Otherwise, the residue is resoluble in a suitable solvent as chloroform, tetrachloroethane, or a chlorobenzene solvent and the solution used as an impregnant, lacquer, varnish and the like, with or without the addition of inert pigment, filling agent, other resinous material and the like.

Illustration of another method of providing the composite product and its application is the following.

EXAMPLE XV

Polyphenylene (30 g., M.P. 160–180° C.), 1,4,-xyleneglycol (15 g.) and p-toluenesulfonic acid monohydrate (5 g.) were slurried in chloroform (200 ml.) and heated at reflux for 19 hours. During which time approximately 1.6–2.0 ml. of water was evolved and collected. The cooled lacquer was used with no further treatments and provided a high temperature resistant coating. Additionally, fabricating coating and molding polyphenylene resin composition has been carried out as in the above process in which polyphenylene, xylyleneglycol and p-toluenesulfonic acid monohydrate were reacted together in-situ at about 66–68° C. for 19 hours. The polyphenylene lacquer was then used to fabricate polyphenylene carbon cloth laminates and found to mold and cure satisfactorily. The consistency of the solution phase was dependent upon the amount of solvent before curing.

EXAMPLE XVI

The same proportions and types of ingredients were used in this example as were used in Example XV, except that 45 g. of polyphenylene were used. The same reaction conditions as in Example XV were used to prepare the lacquer.

EXAMPLE XVII

The same proportions and types of ingredients were used in this example as were used in Example XV except that 60 g. of polyphenylene were used. The same reaction conditions as in Example XV were used to prepare the lacquer.

EXAMPLE XVIII

Each of the polymer lacquers as prepared in Examples XV, XVI, and XVII were used to coat portions of carbon cloth, known to the trade as HITCO CCA–1 and were then vacuum dried. Two typical laminates were then molded from the resin of Example XV as follows:

33 plies (9 g.) of carbon cloth containing 47±2% dried resin by weight were stacked in a mold and molded at 425° F. for 2 hours at 3000 p.s.i. When removed from the mold the laminates weighed 8.66±0.16 g. and had a calculated resin content of 43±1%. The samples were then heated under $N_2$ for 18 hours at 275° F. then heat programmed from 275° F. to 550° F. over a 108 hour period and finally heated to 550° F. After cooling to 200° F., the samples were removed from the oven. They then contained 41% resin solids and weighed 8.1±0.1 g. The laminates were fully cured, hard and tough. Laminates were also prepared from the resins of Examples XVI and XVII in a similar manner and yielded fully cured, hard and tough molding of similar appearance to the laminates from the resin of Example XV.

EXAMPLE XIX

Polyphenylene oxide (20 g.), trichloroethylene (20 ml.), p-dioxane (20 ml.), and tetrahydrofuran (40 ml.) were mixed together and allowed to set for about 16 hours. To this pasty mixture was then added a curing agent solution which had been prepared by refluxing a mixture of 1,4-xylyleneglycol (10 g.), p-toluenesulfonic acid monohydrate (3 g.) and chloroform (100 ml.) for 20 hours while removing water azeotropically. The mixture was then heated at reflux until it became homogeneous (N 1 hr.). Solvent was then removed at 60±10° C. under vacuum yielding 37 g. of solid.

The thermosetting resin was then vacuum dried for 15 minutes at 160° F., then molded for 2 hours at 420° F. and 3,000 p.s.i. Molded parts were removed from the mold at 200° F. and were subsequently post cured for 18 hrs. at 275° C., then 108 hrs. While gradually raising the temperature from 275 to 550° F., then for 6 hours at 550° F., after cooling to 200° F., the specimens were removed from the oven. This post-cure was carried out in an argon atmosphere. If not molded to the precise form and shape desired, the molded resin can be machined to a desired form.

EXAMPLE XX 1,3-xylyleneglycol can also be used as a curing agent. For example, 1,3-xylyleneglycol (10 g.), p-toluenesulfonic acid monohydrate (3 g.) and chloroform were heated at reflux for 20 hours while removing water continuously. The solution was then added to a refluxing solution of polyphenylene (20 g., M.W.=1000) in trichloroethylene (40 ml.). After reacting the combined solutions for 20 hours at 70° C., the heat-setting lacquer was used to coat, impregnate and fabricate molded parts, as described herein.

The above are also illustrative of the manner in which polyphenylene sulfide and polybenzimidazoles are likewise applicable in forming polymers and copolymers in combination with the aromatic polymethylol and acid catalyst polymer combination.

EXAMPLE XXI

A thermosetting polyphenylene varnish-lacquer composition providing an improved coating for ablative reentry structure and improved plastic which can withstand high temperatures, as 400° C., is prepared as follows:

(a) A curing agent solution consisting of the reaction product of 1,4-benzenedimethanol was prepared as in Example I;

(b) A solution of 23 grams polyphenylene polymers having a mean molecular weight of about 1500±500 was prepared by heating and dissolving the said polyphenylenes in a mutual solvent, about 50 ml. hot trichloroethylene (or tetrachloroethane at 100–140° C. may be used) and (a) mixed therewith;

(c) The mixture of (a) and (b) was heated at a temperature of 70–75° C. for a period of 20 hours.

The resultant reaction product is a thermosetting prepolymer lacquer or varnish in homogeneous composition with the curing agent which is stable for working with under normal operating conditions. Upon evaporation of the solvent, the prepolymers mold at temperatures of ($\simeq$400° F.), and pressures of 300 p.s.i. to 3000 p.s.i. to produce superior plastic forms and laminates having greater strength and superior hyperthermal properties than those of the conventional type.

A preferred method of utilizing the thermosetting compositions of this disclosure is provided as follows.

EXAMPLE XXII

Prior to molding, it is preferable to dry or advance the resin composition. This is accomplished by first air drying and heating for 10 to 30 minutes in a vacuum oven at approximately 160° F. The time period will depend upon the particular resin combination. After application, as in molding the resin per se, or in coating and laminate form, the post cure is preferably by steps as follows:

(1) 18 hours at 274° F.;
(2) 108 hours during which the temperature is programmed from 275° to 600° F.;
(3) 1 hour at 600° F.;
(4) Gradual cooling in oven to 200° F.

As disclosed above, it has been discovered that a large variety of polyphenylene polymers possess excellent thermal properties and retain their mechanical properties even after long exposure to high temperature. Many of the now available polymers carbonize to useless end products or are thermoplastic and remain so indefinitely so that their intrinsic potential or thermal resistance could not heretofore be efficiently realized. Still other aromatic polymers have such high melting points that they cannot be fabricated in a conventional manner. It is highly desirable to have available classes of aromatic polymers that can be cured upon the application of heat or heat and pressure in conventional hot molding equipment to yield cured objects whose thermal properties are as good as (or better than) the thermal properties of the normally non-curable aromatic polymer from which they were derived.

It is now found that it is possible to obtain curable reaction products from the partial reaction of a normally noncurable aromatic polymer with a polymer or telomer derived by the condensation of nonphenolic polymethylol aromatic compounds, a suitable acid catalyst. The polymers or telomers derived from the condensation of nonphenolic polymethylol aromatic compounds has been disclosed and described. The aromatic polymers which are useful in the present invention are those that are normally non-curable, or that can only be cured by the application of conditions that make fabrication impractical. Examples of such aromatic polymers that may be combined with the curing agent, as herein provided, are polyphenylene polymers, branched polyphenyl polymers, polyphenylene oxide polymers, polyphenylene sulfide polymers, polybenzimidazoles, and the like. Other less desirable copolymerization polymers may be obtained by mixtures of the polymethylol and acid curing agent with Wurtz-Fittig type polyphenylenes, polyphenylenes from radiation type polymerization, monomers of the above, highly aromatic natural tars, and mixtures thereof provided that satisfactory (soluble) copolymerizable mixtures of the polymers and curing agent can be attained at temperatures below 80°–90° C.

It is found that in order to secure adequate partial reaction under suitable control, it is desirable to conduct the reaction in a suitable solvent. The solvent should have the characteristic that, at the temperature of reaction, it is a solvent for both the aromatic polymer and for the polymer or telomer derived from a nonphenolic polymethylol aromatic compound and acid combination, as herein described. The solvent may be a suitable mixture of solvents, said mixture having the required characteristics or it may be a single solvent. It is also desirable, but not critical that the solvent or mixture of solvents possess those characteristics required for an acceptable lacquer solvent so that filling materials may be coated and impregnated directly from the solution used to effect the partial reaction of the ingredients.

Because the partial reaction appears to involve condensation or hydrolysis followed by condensation, it is necessary to have present a suitable monofunctional or polyfunctional acid to catalyze these reactions. It is preferable to employ a mineral acid, or more preferably, an organo-substituted mineral acid for this purpose; as, for example, a monofunctional or polyfunctional sulfonic acid. The acid may be added prior to starting the reaction, or the acid may already be present as a part of the telomer derived from the nonphenolic polymethylol aromatic compound or present in the solution of said latter polymer or telomer in a free state.

If the composite curable compositions of the present invention are to be utilized in making moldings, laminates, castings or baking lacquers, then the acid used to catalyze the partial reaction of the composite resins of this invention should be retained in solution with or intimately mixed with said composite resin, because the acid material is necessary to effect subsequent cure of said composites of the polyphenyl or polybenzyl compounds and aromatic polymethylol compounds, as described, by the application of heat or heat and pressure.

In carrying out the partial reaction to obtain the curable composite resin compositions of the present invention, it is necessary to effect the reaction at a sufficiently low temperature that the reaction does not go so far as to result in an insoluble and infusible resin. At the same time, it is necessary to carry out the reactions at a sufficiently high temperature so that the reaction can be conducted in a reasonable period of time. The same precautions must be observed with the kind and amount of acid used to catalyze the partial reaction and subsequently to cure completely the composite resin composition by the application of heat or heat and pressure.

Any proportion of either the aromatic polymer constituent or the polymer or telomer derived from the condensation of nonphenolic polymethylol aromatic compounds, may be used in the partially reacted composite resin compositions of the present invention. Any proportion will yield a composite resin composition. However, for practical purposes, the polymer or telomer derived from the condensation of nonphenolic polymethylol aromatic compounds must be present in such a proportion as to yield curable composite resin compositions. On the other hand, the aromatic polymer should be present in such a proportion as to yield composite resin compositions whose properties, when cured, are improved upon or better than the properties of the aromatic polymer constituent alone. It is not possible to define limits of proportion in general terms which would be applicable to all of the many possible combinations of aromatic polymer and of polymer or telomer derived from nonphenolic polymethylol aromatic compounds, and to all the variations, or mixtures, of acid content, acid strength, reaction time, reaction temperature and solvent effect which affect the properties of the composite resin compositions of this invention.

It is necessary for those skilled in the art to select the range of properties desired and then to choose those ingredients and reaction conditions which will yield compositions having said desired range of properties while remaining within the sprit and scope of this invention. Typical ranges for one composite resin composition of this invention is an ingredient proportion of from 2–1 to 10–1 of aromatic polymer to polymer or telomer derived from nonphenolic polymethylol aromatic compound respectively; a reaction temperature of from 60–120° C.; and a reaction time of about 1 to 70 hours, according to the reactivity of the reactants and acid strength. With other ingredients used in the composite resin compositions of this invention, the proportions and reaction condition may well fall outside of the ranges mentioned above. Typical molding and laminating conditions for the composite resin compositions of this invention are a temperature of 300–400° F. and pressures from several hundred to several thousand pounds per square inch. Different types of composite resin composition will generally require different molding conditions and some may fall well outside the ranges given above.

The composite resin compositions of this invention are new compositions of matter consisting as they do of partially reacted normally incurable aromatic polymers and polymers or telomers derived from the condensation of non-phenolic polymethylol aromatic compounds. The composite resin compositions of the present invention which have been cured to an insoluble and infusible form by the application of heat, or heat and pressure, are also, and in like manner, new compositions of matter. Before curing, the soluble composite may be modified by addition thereto of an additive material in monomeric or polymer form to react therewith or be reinforced and set, in more stable form. For example, such additive material may be polyphenylene sulfide material, polyphenylene oxide material, Wurtz-Fittig type polyphenylenes, polyphenylenes from radiation polymerization of aromatic compounds, highly aromatic natural tars, Novalds type phenolic resins or other resinous material, with care being taken to maintain the solution phase between the polyphenylene material and curing agent combination during admixture and curing.

Having described and illustrated the present embodiment of this improvement in the art in accordance with the patent statutes, it will be apparent that some modification and variation may be made without departing from the spirit and scope thereof. The specific embodiments described are given by way of examples illustrative of the improvement discovered applicable herein and which is to be limited only by the terms of the appended claims.

What is claimed is:

1. A method for producing aromatic copolymers of a selective aromatic polymer material and aromatic polymer curing agent in a ratio of not less than 10% polymer curing agent to said selective aromatic polymer material which comprises the steps:
    (1) Mixing aromatic polymers selected from the group consisting of:
        (a) fusible and soluble polyphenylene polymers selected from the group consisting of polymerized biphenyls, terphenyls, quaterphenyls, isomers of terphenyls and quaterphenyls, and mixtures of same, said polymers having a molecular weight on the order of 1000±500 to about 5000 and a carbon:hydrogen atom ratio of over 1.3;
        (b) polyphenylene oxides;
        (c) polyphenylene sulfides;
        (d) polybenzimidazoles;
        (e) and mixtures of said polymers, including mixtures of phenylene polymers with less than 5 aromatic rings; with
    (2) mutually solvent soluble polymers of the condensation product of an aromatic polymethylol compound and acid catalyst present in an amount of not less than about 20% acid material to said polymethylol compound, said polymers consisting of the reaction product of:
        (a) an aromatic polymethylol compound having one or more of the characteristic group

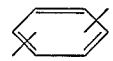

and two or more methylol groups on the same or different characteristic group; and
        (b) an acid catalyst selected from the group consisting of a strong organic substituted mineral acid, including p-toluenesulfonic acid, benzene sulfonic acid, acetamido benzene sulfonic acid, hexanesulfonic acid, cyclohexane sulfonic acid, and other acid material consisting of sulfonic, sulfuric, sulfurous, phosphoric, alkylphosphonic, arylphosphonic, alkylphosphonous, arylphosphonous, partially halogenated derivatives of alkyl and aryl carboxylic acids, and mixtures of said acids;
    (3) heating the mixture in a temperature range of about 70° C. to about 220° C. for a reaction time of about 1 hour to several hours and effecting the patial reaction of copolymerization of said fusible and soluble aromatic polymers and said condensation polymers; and
    (4) obtaining said partially reacted polymers in solvent soluble copolymer form capable of being converted to an infusible and insoluble form by the continued application of heat in excess of 100° C.

2. The process of claim 1 including effecting the copolymerization reaction in solution and the step of removing the solvent from said solution and recovering a plastic fusible copolymerizable product thereof.

3. The process of claim 1 including the steps of continuing heating and obtaining said reacted polymers in an insoluble substantially fully polymerized state.

4. The method of claim 1 including the step of adding a different aromatic monomer or polymer compound to said soluble and fusible copolymers while maintaining the soluble and fusible phase of the copolymers of said aromatic polymer material and said aromatic curing agent.

5. The method of making a fusible and soluble aromatic resinous composition capable of being converted to an infusible and insoluble form by the application of heat at temperatures in excess of 100° C. which comprises:

(A) preparing a solvent solution of a mixture of:
(1) fusible and tractable aromatic polymers selected from the group consisting of:
(a) branched polyphenylenes prepared by the polymerization of an aromatic compound selected from the group consisting of biphenyl, terphenyls, and quaterphenyls, isomers and mixtures thereof,
(b) polyphenylene oxides,
(c) polyphenylene sulfides,
(d) polybenzimidazoles, and
(e) mixtures of said aromatic polymers, said polymers being in a ratio of about 2 to 5 parts with,
(2) about 1 part soluble, aromatic polymeric curing agent which comprises the condensation product of:
(a) a nonphenolic aromatic polymethylol compound, and
(b) an acid catalyst material selected from the group consistnig of sulfuric, sulfurous, phosphoric, aromatic sulfonic, alkylphosphonic, arylphosphonic, alkylphosphonous, arylphosphonous acid, and mixtures of said acids,
(B) heating said mixture under copolymerization reactant conditions of from about 70° C. to about 170° C. and obtaining,
a coreacted soluble and fusible aromatic resinous composition characterized by being capable of further reaction by the application of heat above 100° C. to form homogeneous and insoluble copolymers of said mixture.

6. The method of claim 5 including the steps of removing the solvent and drying the coplymerized mixture.

7. The method of claim 6 including the steps of continuing heating of said coreacted composition and effecting production of homogeneous and insoluble copolymers thereof.

8. The method of claim 5 wherein the curing agent is a mixture of polymers of a dimethylol benzene in combination with a sulfonic acid catalyst.

9. The method of claim 5 wherein said polyphenylene polymers are soluble and tractable polyphenylenes selected from the group consisting of soluble and fusible polymers of biphenyl, ortho-terphenyl, meta-terphenyl, and 1,3,5-triphenylbenzene, isomers thereof and mixtures of the same with other phenylene polymers with less than five aromatic rings and said curing agent consists of a mixture of polymers of aromatic polymethylol and acid catalyst.

10. The method of claim 5 including adding a filler material, heating and effecting copolymerization of said aromatic polymers and curing agent.

References Cited

UNITED STATES PATENTS

| | | | |
|---|---|---|---|
| 3,116,265 | 12/1963 | Huang et al. | 260—823 |
| 3,231,544 | 1/1966 | Cotman et al. | 260—2 |
| 3,244,721 | 4/1966 | Bain et al. | 260—2X |
| 3,320,183 | 5/1967 | Brown | 260—2 |
| 3,338,844 | 8/1967 | Harris et al. | 260—2 |
| 3,396,146 | 8/1968 | Schmukler | 260—823 |
| 3,423,335 | 1/1969 | Phillips | 260—2 |

OTHER REFERENCES

Koviac et al.: "Journal of Polymer Science," vol. 47, 1960, pp. 44–54.

MURRAY TILLMAN, Primary Examiner

M. J. TULLY, Assistant Examiner

U.S. Cl. X.R.

260—2, 33.8, 47, 67, 78, 79